UNITED STATES PATENT OFFICE.

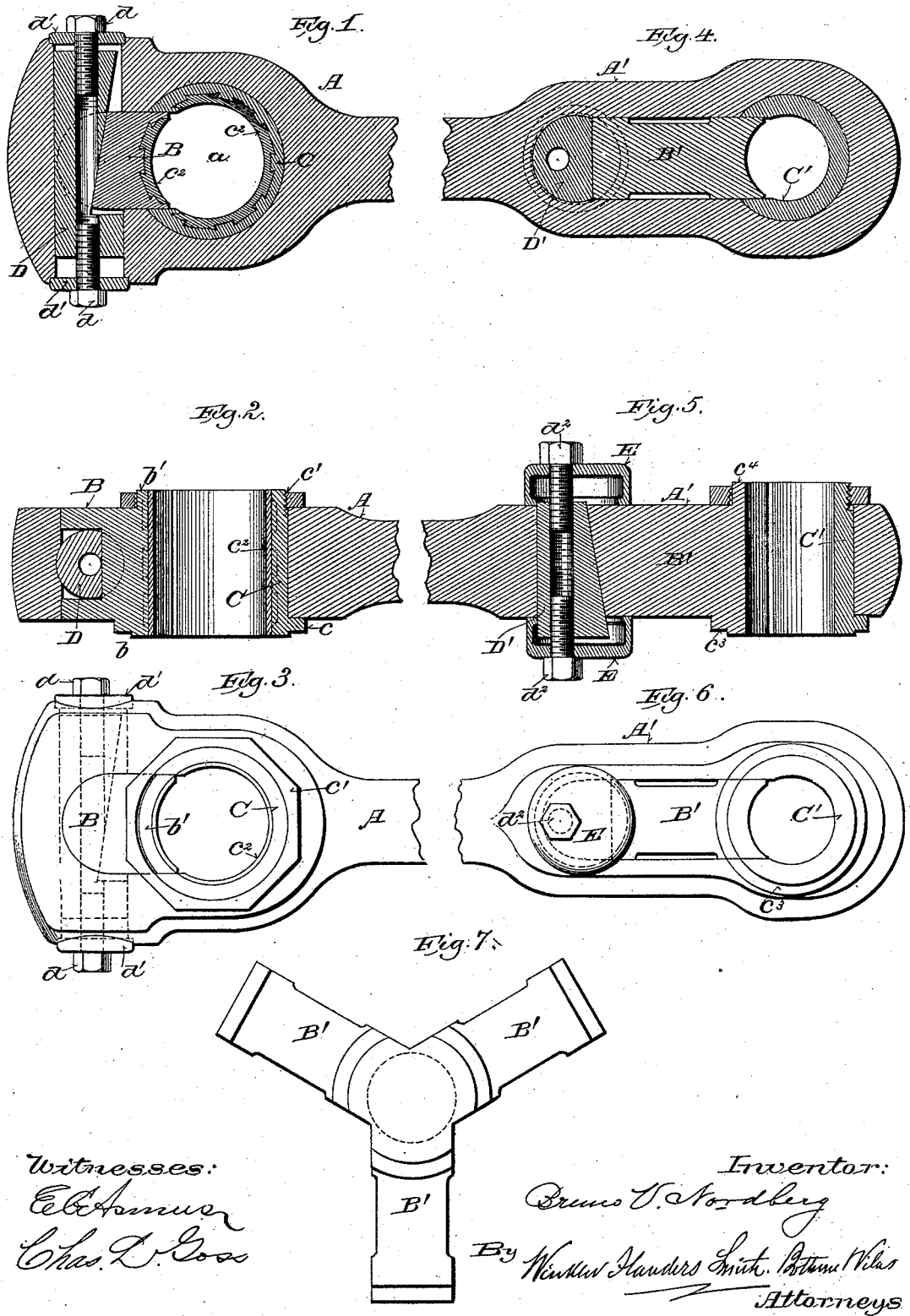

BRUNO V. NORDBERG, OF MILWAUKEE, WISCONSIN.

ADJUSTABLE BEARING.

SPECIFICATION forming part of Letters Patent No. 468,822, dated February 16, 1892.

Application filed September 15, 1890. Serial No. 365,002. (No model.)

*To all whom it may concern:*

Be it known that I, BRUNO V. NORDBERG, of Milwaukee, in the county of Milwaukee and State of Wisconsin, have invented certain new and useful Improvements in Adjustable Bearings; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The objects of my invention are to avoid hand work and fitting, to reduce the cost of manufacture, and to improve, generally, the construction of this class of bearings.

It consists of certain peculiarities of construction and arrangement hereinafter particularly described, and pointed out in the claims.

In the accompanying drawings like letters designate the same parts in the various figures.

Figure 1 is a section of the key-head of a connecting-rod embodying my improvements, taken at right angles to the axis of the bearing. Fig. 2 is an axial section, and Fig. 3 a side elevation, of the same. Figs. 4, 5, and 6 are like views of a modified construction, and Fig. 7 is a detail illustrating the method of forming a number of the adjustable bearing-pieces together.

For convenience of illustration I have shown my improvements in connection with key-heads of connecting-rods or pitmen; but they may be adapted and applied with advantage to other kinds of adjustable bearings.

Referring to Figs. 1, 2, and 3, A represents a solid key-head of a connecting-rod, having the laterally-recessed bore $a$, which can be produced by a milling-tool. The recess in one side of the bore for the reception of the adjustable bearing block or piece B, being of smaller diameter than the bore and terminating in a half-circle, may be formed with a side-cutting milling-tool.

C is a metallic bushing of brass or other suitable metal or material, formed at one end with an outwardly-projecting flange $c$ and externally threaded at the other end. It can be made and finished on a lathe without hand-work. $c'$ is a nut fitted to the end of the bushing C and adapted to hold the same in the head A. By thus constructing the bushing C with the flange $c$ and providing it with the nut $c'$ the exact work required to fit the flanges on the ordinary brasses or bearing-pieces to the sides of the head in which they are to be used and the accurate fitting of the sides of the head are obviated, inasmuch as the nut $c'$ may be turned up more or less, so as to bring it and the flange $c$ snugly against the sides of the head whether the thickness of the head be a little more or less.

Turning of the bushing C in the head A is prevented by the adjustable bearing-piece B, which is fitted in the recess provided for its reception in the head A and projects into a slot or opening through one side of the bushing. The bushing C and the concave face of the bearing-piece B may be provided with a lining $c^2$ of Babbitt metal, graphite, or other suitable material, as shown. The bearing-piece B is preferably formed with flanges $b$ and $b'$ to produce in effect continuations of the projecting ends and of the flange of the bushing C. The flange $b'$ is turned down sufficiently to clear the thread of nut $c'$. These flanges not only improve the appearance of the bearing, but serve to hold the bearing-piece in place, being held between the shoulders or flanges on the crank-pin or journal.

Any suitable device may be employed for the adjustment of the bearing-piece B. I prefer, however, to employ a key D, which is fitted to a cylindrical key-seat intersecting the recess in which the bearing-piece B is inserted and formed with an inclined bearing-face, which engages a corresponding face formed on the back of the bearing-piece B. This key may be conveniently adjusted by means of screws $d\,d$, engaging threaded openings in its ends and bearing at their heads upon washers $d'$, placed over the ends of the cylindrical key-seat. The key is made somewhat shorter than the seat in which it is placed, so as to permit of the required longitudinal movement for adjusting the bearing-piece B. The inclined bearing-surface on the back of the bearing-piece B is formed by cutting a groove therein, as shown, through which the key D passes, thereby retaining said bearing-piece in its proper position. The slot through the side of the bushing C for the reception of the bearing-piece B is formed on a planer, the bushing being held in a jig for the purpose. The bearing-piece B is made and finished on a milling-machine. The key D is milled from round iron or steel and its seat is milled or drilled in the head A. It will be seen, therefore, that the entire bearing can be made complete without hand work or fitting and that a great saving is thus effected in the labor and cost of construction.

Referring to Figs. 4, 5, and 6, the bearing-piece B' is made somewhat longer than that shown in the preceding figures, and the half-round end of the recess in which it is placed constitutes the key-seat, the key D' being placed therein parallel with the axis of the bearing.

To hold the adjacent end of the bearing-piece B' in place and to permit of the necessary endwise movement of the key, I place recessed or cup-shaped caps E E over the ends of the key-seat, so that they will overlap the bearing-piece B'. These caps are perforated and provide bearings for the heads of the adjusting-screws $d^2$, which hold them, as well as the key D', with which they engage, in place. The bearing-piece B' projects at the opposite end into the slot in the side of the cylindrical bushing C', and thereby prevents the same from turning in the manner hereinbefore specified. The concave face of the bearing-piece B' being about one-third of the circumference of the bearing, three bearing-pieces may be cast and finished together, as shown in Fig. 7. The flanges $c^3$ $c^4$, being turned at one operation on a lathe and the bore forming the concaved bearing-surfaces being made before the parts are separated, will thus be made uniform and accurate and a considerable saving will be effected in labor, inasmuch as a number of similar parts are produced with the same or less labor than one could be produced.

Other well-known devices may be employed in connection with my improvements for the adjustment of the movable bearing-piece. I prefer, however, the devices shown, inasmuch as they can be made without hand-work and are well adapted for the purpose.

For large connecting-rods or bearings the adjustable bearing-piece may be made in two or more parts or sections, that forming the bearing proper being made of brass or some suitable material, while the remainder is formed of iron or other cheaper metal.

The recess in the head A' is preferably formed by first milling and reaming to accurate size the bore for the crank-pin or journal and the bore for the key D' and then milling the slot between and connecting them, commencing in the larger bore made for the crank-pin or journal. The bore for the key is made of a little larger diameter than the connecting-slot, as shown in Fig. 4, to allow for any slight inaccuracy in centering the bores to intersect the axis of the rod and in cutting the connecting-slot so that the slot so formed will terminate wholly within the bore for the key. The term "semicircular" as applied herein to the end of the recess in the head is intended to include not only the construction in which the bore for the key is made of larger diameter than the intersecting slot, but also constructions in which the bore for the key is made of the same and of less diameter than the intersecting slot.

In some cases the flanges on the adjustable bearing-piece and the flanges and nut on the bushing may be dispensed with, the shoulders of the crank-pin or journal being depended upon to hold the bushing and bearing-piece thereon and the key to hold them in place in the head.

Various changes may be made in the details of construction without departing from the principle of my invention.

I claim—

1. In an adjustable bearing, the combination of a head having a recessed bore, a movable bearing-piece placed in the recess of said bore, and a cylindrical bushing having an opening through one side to receive said bearing-piece, which holds it from turning and constitutes a part of the journal-bearing, substantially as and for the purposes set forth.

2. In an adjustable bearing, the combination of a head having a recessed bore, an adjustable bearing-piece held in the recess of said bore, and a cylindrical bushing adapted to said bore and provided at one end with an outwardly-projecting flange and at the other with a nut, said bushing being slotted in one side to receive said bearing-piece, by which it is held from turning, substantially as and for the purposes set forth.

3. In an adjustable bearing, the combination of a head having a recessed bore, an adjustable bearing-piece adapted to the recess of said bore, a key having an inclined surface presented to said bearing-piece and adapted by its lengthwise movement to adjust the same, and a cylindrical bushing adapted to said bore and slotted in one side to receive said bearing-piece, which holds it from turning, substantially as and for the purposes set forth.

4. In an adjustable bearing, the combination of a head having a recessed bore, a cylindrical bushing adapted to said bore and slotted in one side to correspond with the recess in said bore, an adjustable bearing-piece adapted to said recess and projecting at one end into the slot in said bushing, so as to hold the same from turning, and formed with an inclined bearing-surface at the opposite end, and a key fitted to a cylindrical seat in said head and having an inclined bearing-surface presented to the corresponding surface of said adjustable bearing-piece, substantially as and for the purposes set forth.

5. In an adjustable bearing, the combination of a head having a recessed bore, the recess terminating in a semicircle, which constitutes the key-seat, an adjustable bearing-piece adapted to said recess and having one end concaved and the other beveled, and a key adapted to the semicircular end of said recess parallel with the axis of the bore and having a beveled bearing-surface on one side presented to the beveled end of said adjustable bearing-piece, substantially as and for the purposes set forth.

6. In an adjustable bearing, the combination of a head having a recessed bore, the recess terminating in a semicircle, a cylindrical bushing adapted to said bore and slotted in one side to correspond with said recess, an adjustable bearing-piece adapted to said recess and concaved and projecting at one end into the slot in said bushing and beveled at the other end, a key adapted to the semicircular portion of said recess and having a beveled surface on one side presented to the beveled end of said bearing-piece, recessed caps placed over the ends of the key-seat and overlapping said bearing-piece, and adjusting-screws engaging threaded holes in the ends of said key and bearing at the heads against the outer faces of said caps, through which they pass, substantially as and for the purposes set forth.

7. In an adjustable bearing, the combination of a slotted head having a recessed bore, the recess terminating in a semicircle and being of less diameter than the bore, a cylindrical bushing adapted to said bore and slotted through one side to correspond with said recess, an adjustable bearing-piece adapted to said recess and projecting into the slot in said bushing, so as to hold the same from turning, and means of adjusting said bearing-piece and holding the same in place, substantially as and for the purposes set forth.

8. In an adjustable bearing, the combination of a head having a recessed bore, an adjustable bearing-piece adapted to said recess, a cylindrical key-seat intersecting said recess, a key adapted to said key-seat and having an inclined bearing-face on one side presented to said adjustable bearing-piece, recessed caps placed over the ends of said key-seat, and adjusting-screws engaging threaded holes in the ends of said key and bearing at their heads against the outer faces of said caps, through which they pass, substantially as and for the purposes set forth.

9. In an adjustable bearing, the combination of a head having a recessed bore, a cylindrical bushing adapted to said bore and formed at one end with an outwardly-projecting flange and threaded at the other end, which is provided with a nut, said bushing being slotted through one side to correspond with said recess, and an adjustable bearing-piece adapted to said recess and formed on the sides at its concave end with flanges corresponding with the ends and flange of said bushing, substantially as and for the purposes set forth.

In testimony that I claim the foregoing as my own I affix my signature in presence of two witnesses.

BRUNO V. NORDBERG.

Witnesses:
   CHAS. L. GOSS,
   E. G. ASMUS.